US009738022B2

(12) United States Patent
Takai

(10) Patent No.: US 9,738,022 B2
(45) Date of Patent: Aug. 22, 2017

(54) MOLDING DEVICE AND MOLDING METHOD USING THE MOLDING DEVICE

(75) Inventor: Mitsuo Takai, Mori-machi (JP)

(73) Assignee: CAP CO., LTD., Shuuchi-gun, Shizuoka (JP)

( * ) Notice: Subject to any disclaimer, the term of this patent is extended or adjusted under 35 U.S.C. 154(b) by 409 days.

(21) Appl. No.: 13/261,673

(22) PCT Filed: Dec. 21, 2011

(86) PCT No.: PCT/JP2011/079610
§ 371 (c)(1),
(2), (4) Date: Sep. 2, 2013

(87) PCT Pub. No.: WO2012/086675
PCT Pub. Date: Jun. 28, 2012

(65) Prior Publication Data
US 2013/0334741 A1    Dec. 19, 2013

(30) Foreign Application Priority Data

Dec. 24, 2010   (JP) .................... 2010-288977

(51) Int. Cl.
B29C 45/73    (2006.01)
B29C 33/02    (2006.01)
(52) U.S. Cl.
CPC ............. B29C 45/73 (2013.01); B29C 33/02 (2013.01); B29C 2033/023 (2013.01); B29C 2045/7368 (2013.01)
(58) Field of Classification Search
CPC ............................................. B29C 2045/7368
(Continued)

(56) References Cited

U.S. PATENT DOCUMENTS 2,801,442 A * 8/1957 Moslo .................. B29C 45/844
425/137
5,591,491 A * 1/1997 Ando ..................... B29C 35/12
264/450
(Continued)

FOREIGN PATENT DOCUMENTS

CN    2770927    4/2006
JP    57004748    1/1982
(Continued)

Primary Examiner — Matthew Daniels
Assistant Examiner — Kimberly A Stewart
(74) Attorney, Agent, or Firm — Michael Tobias

(57) ABSTRACT

A molding device which can heat molding portions of dies by a simple structure while guaranteeing the durability of the molding portions of the dies, and a method of molding a product using the molding device are provided. A molding device 100 includes a first die 110 and a second die 120 for molding a product PR to be molded. The first die 110 and the second die 120 have a first molding portion 111 and a second molding portion 121 formed at central portions of the surfaces which face each other. Each of the first molding portion 111 and the second molding portion 121 has a three-dimensional shape corresponding to the surface shape of the product PR. Thermal/electrical insulators 113 and 124 are provided around the first molding portion 111 and the second molding portion 121 of the first die 110 and the second die 120. An electrical power supply apparatus 136 is connected to the first die 110 and the second die 120 through input/output electrodes 132 and 133, and the first die 110 and the second die 120 can be electrically connected together through connection electrodes 134 and 135 and electrically disconnected from each other.

20 Claims, 4 Drawing Sheets

(58) Field of Classification Search
USPC .................................................. 264/403, 404
See application file for complete search history.

(56) References Cited

U.S. PATENT DOCUMENTS

| | | | | |
|---|---|---|---|---|
| 5,965,080 | A | 10/1999 | Ando et al. ................... | 264/404 |
| 6,048,189 | A * | 4/2000 | Kurihara ................. | B29C 49/20 |
| | | | | 249/79 |
| 6,203,731 | B1 * | 3/2001 | Kato ....................... | B29C 45/00 |
| | | | | 264/328.16 |
| 7,679,036 | B2 | 3/2010 | Feigenblum et al. ........ | 219/635 |
| 2010/0221373 | A1 * | 9/2010 | Chen ....................... | B29C 33/04 |
| | | | | 425/3 |
| 2012/0168990 | A1 * | 7/2012 | Kuwahara ............... | B29C 33/08 |
| | | | | 264/404 |

FOREIGN PATENT DOCUMENTS

| | | |
|---|---|---|
| JP | 59109310 | 6/1984 |
| JP | 04033809 | 2/1992 |
| JP | 04197722 | 7/1992 |
| JP | 04265720 | 9/1992 |
| JP | 09123240 | 5/1997 |
| JP | 10-217252 | 8/1998 |
| JP | 11348041 | 12/1999 |
| JP | 2003-191264 | 7/2003 |
| JP | 2007118213 | 5/2007 |
| JP | 2009202348 | 9/2009 |
| WO | 96/07532 | 3/1996 |
| WO | 2007535786 | 12/2007 |

\* cited by examiner

MOLDING DEVICE AND MOLDING METHOD USING THE MOLDING DEVICE

TECHNICAL FIELD

The present invention relates to a molding device which molds a product by disposing (including injecting) a material for molding which has plasticity or fluidity in a space between a pair of dies each formed into a three-dimensional shape corresponding to the surface shape of the product to be molded. The present invention also relates to a method of molding a product by using the molding device.

In a conventional molding device, a material for molding which has plasticity or fluidity (e.g., a resin material or metallic material) is disposed in a space between a pair of dies so as to perform molding. It has been known that in such a molding device, it is possible to perform molding precisely while preventing a decrease in the plasticity or fluidity of the material for molding, by preheating the molding portions of the dies used to form the material for molding before forming the material.

As shown in, for example, below-listed Patent Documents 1 to 5, various arrangements for heating dies in advance are known, including the following:

an induction heating arrangement in which an inductor is disposed around dies or in the molding portions thereof so as to inductively heat the dies or molding portions thereof (see Patent Documents 1 and 2);

a heat-source embedding arrangement in which a heating wire or a channel through which a heated fluid is passed is provided inside dies so as to heat the dies or molding portions thereof (see Patent Documents 3 and 4);

an external heat source arrangement in which a heat generating body (e.g., a heating wire, an infrared lamp, or the like) is provided for molding portions of dies or a heated fluid is supplied to the molding portions so as to heat the dies or the molding portions thereof (see Patent Documents 5 and 6); and a surface layer energization arrangement in which a conductor layer is provided on the surface of each die with an insulating layer provided therebetween, and electricity is supplied to the conductor layer so as to heat the die (see Patent Document 7).

Of these arrangements, the surface layer energization arrangement is superior to other arrangements because the cycle time, which is the time between charging of a material for molding and completion of molding of a product, is short and a structure for heating dies or molding portions thereof is simple.

PRIOR ART DOCUMENTS

Patent Documents

Patent Document 1: Japanese Kohyo Patent Publication No. 2007-535786
Patent Document 2: Japanese Patent Application Laid-Open (kokai) No. S57-4748
Patent Document 3: Japanese Patent Application Laid-Open (kokai) No. 2007-118213
Patent Document 4: Japanese Patent Application Laid-Open (kokai) No. H11-348041
Patent Document 5: Japanese Patent Application Laid-Open (kokai) No. 2009-202348
Patent Document 6: Japanese Patent Application Laid-Open (kokai) No. H09-123240
Patent Document 7: Japanese Patent Application Laid-Open (kokai) No. H04-265720

However, the surface layer energization arrangement has a problem in that an insulating layer and a conductor layer must be formed on the surface of each die, and a process of forming the insulating layer and the conductor layer is complicated. In particular, in a process of forming dies, die correction (the operation of correcting the shapes of the molding portions) is performed a plurality of times. Therefore, formation of the insulating layer and the conductor layer must be performed every time die correction is performed. The dies having insulating layers and conductor layers formed thereon also have a problem in that since the conductor layers, which are thin films, are damaged as a result of performing molding operations several times to several tens of times, the durability of the dies is low, and maintenance of the dies is complicated.

The present invention was accomplished in order to solve the above-described problems, and its object is to provide a molding device which can heat molding portions of dies by a simple structure while guaranteeing the durability of the molding portions of the dies. Another object of the present invention is to provide a method of molding a product by using the molding device.

SUMMARY OF THE INVENTION

In order to achieve the above-described object, the present invention provides a molding device which comprises a first die which has a first molding portion formed into a three-dimensional shape corresponding to a portion of the surface of a product to be molded, and a second die which has a second molding portion formed into a three-dimensional shape corresponding to another portion of the surface of the product and which faces the first die, the product being molded from a material for molding disposed between the first molding portion and the second molding portion, the molding device being characterized in that a die energization means is provided so as to supply electricity to at least one of the first die and the second die, and the first die and/or the second die is formed such that the first molding portion and/or the second molding portion to which electricity is supplied is smaller in thickness than a peripheral portion which is formed around the first molding portion and/or the second molding portion and which supports the first molding portion and/or the second molding portion.

According to this feature of the present invention, the molding device includes die energization means for supplying electricity to at least one of the first die and the second die which have the first molding portion and the second molding portion for forming the surface of the product. Also, the first molding portion and/or the second molding portion to which electricity is supplied from the mold energization means is made smaller in thickness than the peripheral portions of the dies formed around the first molding portion and the second molding portion. Namely, the cross-sectional area of the first molding portion and/or the second molding portion to be heated is decreased, and the resistance of the first molding portion and/or the second molding portion is increased. Therefore, in the case where direct current or alternating current is supplied to the first die and/or the second die, the first die and/or the second die can be quickly heated by using a small amount of electrical energy compared with the case where the first molding portion and/or the second molding portion has the same thickness as the peripheral portions of the dies. Furthermore, since the first molding portion and/or the second molding portion does not require a conductor layer and an insulating layer used in the conventional technique, the man-hours required for manufacturing dies and maintaining them can be reduced. Namely, the molding device according to the present invention can heat the dies by a simple structure while guaranteeing the durability of the molding portions of the dies.

Another feature of the present invention is as follows. In the molding device, the first die and/or the second die has a hollow portion which is located on the back side of the thin first molding portion and/or the thin second molding portion and which extends along the first molding portion and/or the second molding portion.

According to this feature of the present invention, the first die and/or the second die of the molding device has a hollow portion which is formed on the back side of the first molding portion and/or the second molding portion such that the hollow portion extends along the first molding portion and/or the second molding portion. In this case, the back side of the first molding portion (or the second molding portion) refer to the side opposite the molding surface of the first molding portion (or the second molding portion) used for forming the material for molding into the product. When electricity is supplied to the first die and/or the second die, it is possible to prevent the supplied electricity from flowing through central portions of the first die and/or the second die and to instead cause the electricity to flow through the first molding portion and/or the second molding portion. Namely, current which tends to flow through the first die and/or the second die along the shortest paths can be led to the first molding portion and/or the second molding portion, whereby the first die and/or the second die can be heated efficiently. Also, the first hollow portion(s) formed in the first die and/or the second die can reduce the weight of the molding device. In addition, since other members, components, or mechanism of the molding device can be accommodated in the hollow portion(s) formed in the first die and/or the second die, the size of the molding device can be reduced further.

Another feature of the present invention is as follows. In the molding device, cooling fluid supply means for supplying a cooling fluid to the first molding portion and/or the second molding portion is provided in the hollow portion.

According to this feature of the present invention, the molding device includes a cooling fluid supply means which is provided in the hollow portion and which supplies a cooling fluid to the first molding portion and/or the second molding portion. The cooling fluid may be any of various types of liquids and gases (e.g., water, oil, liquid nitrogen, water vapor, and air). As a result, the first die and/or the second die provided with the cooling fluid supply means can quickly cool the first molding portion and/or the second molding portion which are in a heated state. Furthermore, since the first molding portion and/or the second molding portion has a reduced thickness, the first molding portion and/or the second molding portion can be cooled more quickly and can be re-heated more quickly.

Another feature of the present invention, is as follows. In the molding device, a rib for supporting the first molding portion and/or a rib for supporting the second molding portion is provided in the hollow portion.

According to this feature of the present invention, the molding device has a rib which is provided in the hollow portion and which supports the first molding portion and/or the second molding portion. As a result, it becomes possible to reduce the thickness of the first molding portion and/or the second molding portion while ensuring the rigidity thereof, whereby the first molding portion and/or the second molding portion can be heated more efficiently.

Another feature of the present invention is as follows. In the molding device, a temperature measurement sensor for measuring the temperature of the first molding portion and/or the temperature of the second molding portion is provided in the hollow portion.

According to this feature of the present invention, the molding device includes a temperature measurement sensor which is provided in the hollow portion and which measures the temperature of the first molding portion and/or the temperature of the second molding portion. Since the temperature of the first molding portion and/or the temperature of the second molding portion can be determined, the temperature of the first molding portion and/or the temperature of the second molding portion can be controlled properly, whereby the product can be molded more efficiently and more accurately.

Another feature of the present invention is as follows. In the molding device, the die energization means includes an electrical connection portion which electrically connects the first die and the second die together and electrically disconnects the first die and the second die from each other.

According to this feature of the present invention, the die energization means of the molding device includes an electrical connection portion which electrically connects the first die and the second die together and electrically disconnects the first die and the second die from each other. As a result, the die energization means can supply electricity from a single power supply to the first die and the second die through the electrical connection portion. Therefore, the structure of the molding device can be simplified.

Another feature of the present invention is as follows. In the molding device, an insulator is provided on the peripheral portions of the first die and the second die between the two dies.

According to this feature of the present invention, the molding device includes an insulator which is provided on the peripheral portions of the first die and the second die between the two dies. Therefore, electricity can be supplied to the first die and the second die in a closed state in which the first die and the second die are bought into close contact with each other. As a result, when one of the first die and the second die is heated as a result of supply of electricity thereto, the other of the first die and the second die can be heated by thermal conduction. In addition, since the first die and the second die can be heated in a closed state, it is possible to efficiently heat the first molding portion and the second molding portion while preventing dissipation of heat therefrom. Moreover, since the first die and the second die can be heated in a closed state, it is possible to heat the first molding portion and the second molding portion during the process of forming the material for molding into a product, whereby molding accuracy can be improved.

The present invention can be implemented not only as a molding device but also as a method of molding a product by using the molding device.

Specifically, the present invention provides a molding method for molding a product from a material for molding disposed between a first die which has a first molding portion formed into a three-dimensional shape corresponding to a portion of the surface of a product, and a second die which has a second molding portion formed into a three-dimensional shape corresponding to another portion of the surface of the product and which faces the first die, the method being characterized by comprising making at least one of the first molding portion and the second molding portion thinner than a peripheral portion which is formed around the first molding portion and/or the second molding portion and which supports the first molding portion and/or the second molding portion; heating the first molding portion and/or the second molding portion by supplying electricity to the first die and/or the second die which have the thin first molding portion and the thin second molding portion; and forming the material for molding into the product by the heated first molding portion and/or the heated second molding portion.

In this case, the molding method preferably further comprises forming a hollow portion in the first die and/or the second die such that the hollow portion is located on the back side of the first molding portion and/or the second molding portion and extends along the first molding portion and/or the second molding portion; providing, in opposition to the hollow portion, cooling fluid supply means for supplying a cooling fluid to the first molding portion and/or the second molding portion; and cooling the first molding portion and/or the second molding portion after forming the material for molding into the product by supplying the cooling fluid from the cooling fluid supply means to the first molding portion and/or the second molding portion.

According to features of a method according to the present invention, actions and effects similar to those provided by the above-described molding device can be yielded.

MODES FOR CARRYING OUT THE INVENTION

Figure 1:
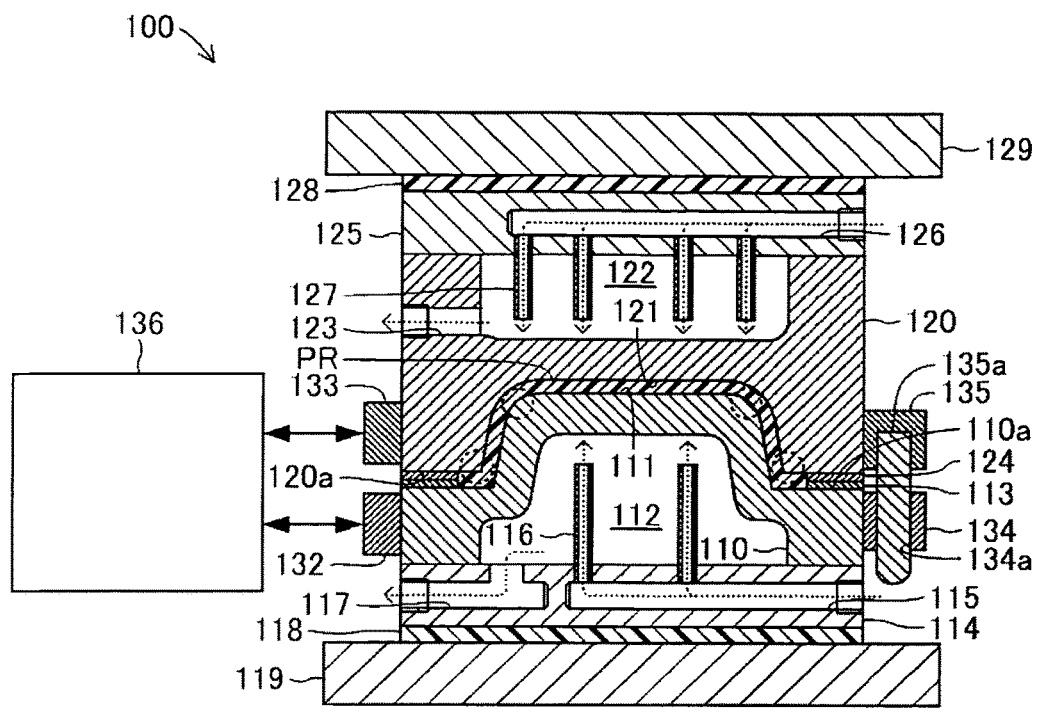
FIG. 1 is a sectional view schematically showing the structure of a main portion of a molding device according to the present invention.
Figure 2:
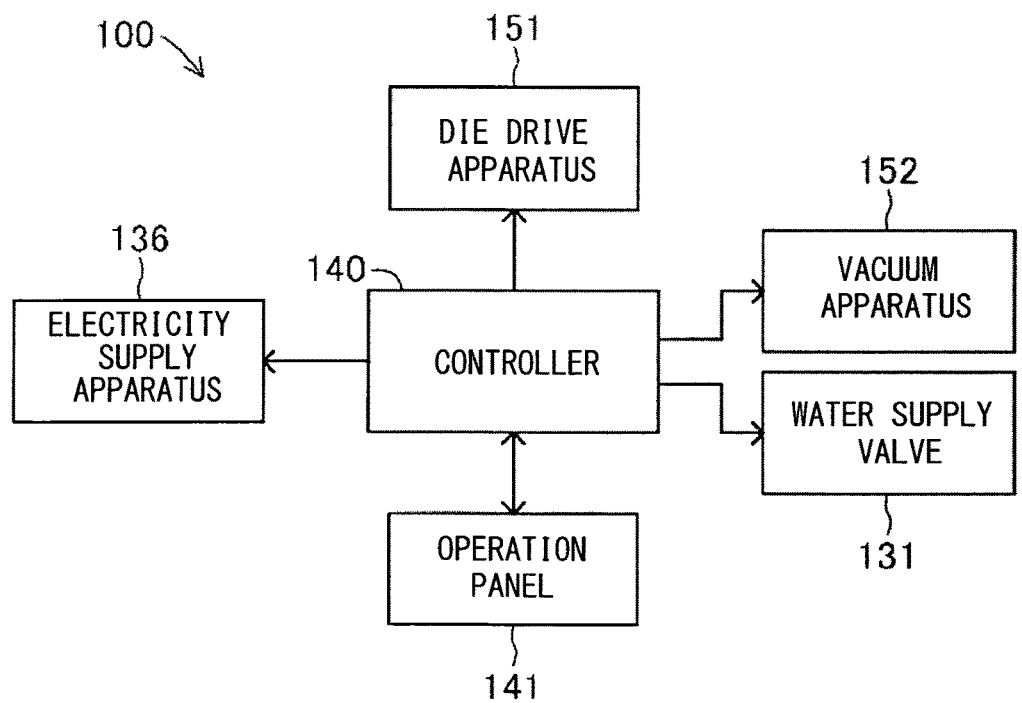
FIG. 2 is a block diagram of a control system which controls operation of the molding device shown in FIG. 1.

Below, an embodiment of a molding device according to the present invention will be described with reference to the drawings. FIG. 1 is a sectional view schematically showing the structure of a main portion of a molding device 100 according to the present invention. FIG. 2 is a block diagram of a control system which controls operation of the molding device 100. In each of the drawings which will be referred to herein, some components are shown schematically, such as in an exaggerated manner so as to facilitate an understanding of the present invention. Therefore, the dimensions, dimensional ratios, etc. of the constituent elements may differ from the actual dimensions, dimensional ratios, etc.

This molding device 100 is a molding machine for manufacturing a product PR made of FRP (fiber reinforced plastic) by heating and compressing (forming) a material for molding which includes thermoplastic resin sheets and a fiber sheet laminated together. Examples of the product PR include various components which constitute two-wheel or four-wheel self-propelled vehicles, ships, and aircraft, and various components which constitute drive systems for driving the vehicles, ships, and aircraft.

(Structure of the Molding Device 100)

The molding device 100 includes a first die 110 and a second die 120. The first die 110 and the second die 120 are made of steel and cooperate together so as to form the material for molding into the product PR. The first die 110 and the second die 120 have a first molding portion 111 and a second molding portion 121, respectively, which are formed at the centers of the surfaces of the dies which face each other. The first molding portion 111 and the second molding portion 121 are portions which actually apply heat and compressive force to the material for molding so as to perform molding, and they are formed into a three-dimensional shape corresponding to the surface shape of the product PR. More specifically, they are formed into a three-dimensional shape which is reversal of the three-dimensional surface shape of the product PR.

In the present embodiment, the first molding portion 111 is a so-called core which has a convex shape (i.e., it projects upward) which corresponds to the concave shape of the lower surface of the product PR. The first molding portion 111 of the first die 110 has a thickness (the dimension in the vertical direction in FIG. 1) smaller than that of a first peripheral portion 110a of the first die 110. The first peripheral portion 110a is a flat portion of the first die 110 which extends around the first molding portion 111 and serves as a parting surface which faces a second peripheral portion 120a of the second die 120. Namely, the first molding portion 111 is formed on the inner side of the first peripheral portion 110a. The first peripheral portion 110a has a thickness sufficient to prevent deformation of the first molding portion 111 when the first die 110 receives a pressing force from the second die 120. In the present embodiment, the first peripheral portion 110a of the first die 110 has a thickness of about 150 mm, and the first molding portion 111 has a thickness of about 20 mm.

The first die 110 also has a first hollow portion 112 which is formed on the side opposite the first molding portion 111 and has a concave shape. The first hollow portion 112 has the shape of a recess which matches the convex shape of the first molding portion 111. More specifically, the first hollow portion 112 is formed along the first molding portion 111 such that the inner wall surface facing the first molding portion 111 has a shape corresponding to the shape of the first molding portion 111. Namely, the thickness of the first molding portion 111 is maintained smaller than that of the second peripheral portion 110a.

In the present embodiment, the second molding portion 122 defines a so-called cavity and has a concave shape (i.e., it has a downward-facing recess) which corresponds to the convex shape of the upper surface of the product PR. The second molding portion 121 of the second die 120 has a thickness smaller than that of the second peripheral portion 120a of the second die 120. Like the first peripheral portion 110a, the second peripheral portion 120a is a flat portion of the second die 120 which extends around the second molding portion 121 and serves as a parting surface which faces the first peripheral portion 110a of the first die 110. Namely, the second molding portion 121 is formed on the inner side of the second peripheral portion 120a. The second peripheral portion 120a has a thickness sufficient to prevent deformation of the second molding portion 121 when the second die 120 receives a reaction force from the first die 110 produced as a result of pressing of the first die 110 by the second die 110. In the present embodiment, the second peripheral portion 120a of the second die 120 has a thickness of about 150 mm, and the second molding portion 121 has a thickness of about 20 mm.

The second die 120 also has a second hollow portion 122 which is formed on the side opposite the second molding portion 121 and has a concave shape. The second hollow portion 122 has the shape of a recess which extends along the deepest portion of the second molding portion 121 which extends horizontally in FIG. 1. More specifically, the second hollow portion 122 is formed along the second molding portion 121 such that the inner wall surface facing the second molding portion 121 has a shape corresponding to the shape of the second molding portion 121. Namely, the thickness of the second molding portion 121 is maintained smaller than that of the second peripheral portion 120a. The second hollow portion 122 has a water drain hole 123 formed such that it communicates with the horizontally extending deepest portion.

The water drain hole 123 is a hole which extends like a pipe so as to drain cooling water from the second hollow portion 122 to the outside of the second die 120. One end of the water drain hole 123 communicates with the second hollow portion 122, and the other end of the water drain hole 123 is open to the left side surface of the second die 120. The other end of the water drain hole 123 open to the left side surface of the second die 120 and is connected to an unillustrated drain pipe.

Figure 3:
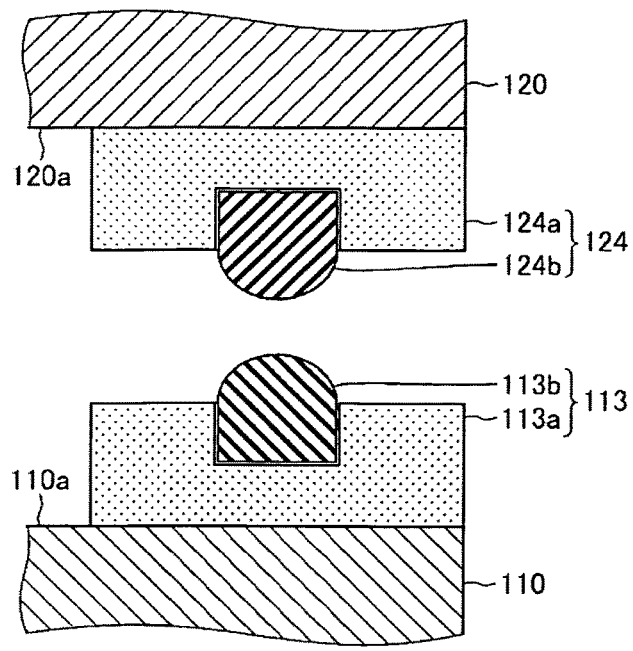
FIG. 3 is an enlarged sectional view schematically showing the structure of a thermal/electrical insulator in the molding device shown in FIG. 1.

Thermal/electrical insulators 113 and 124 are provided on the first and second peripheral portions 110a and 120a, respectively, of the first and second dies 110 and 120. The thermal/electrical insulators 113 and 124 thermally insulate a molding region between the closed first and second dies 110 and 120 from the outside, maintain the airtightness of the molding region, and electrically insulate the first and second dies 110 and 120 from each other. As shown in FIG. 3, the thermal/electrical insulators 113 and 124 are fixed on the first peripheral portion 110a of the first die 110 and the second peripheral portion 120a of the second die 120, respectively, such that they surround the first molding portion 111 and the second molding portion 121 respectively, and face each other. In the present embodiment, the thermal/electrical insulators 113 (124) have a base portion 113a (124a) which is formed by binding and forming glass fibers into an annular shape by using phosphate as a binder such that the annular base portion has a concave cross sectional shape (i.e., it has a recess), and a seal portion 113b (124b) which is formed of silicon rubber and which is fitted into the recess of the base portion 113a (124a). Accordingly, the seal portions 113b and 124b of the thermal/electrical insulators 113 and 124 press each other, elastically deform, and come into close contact with each other to thereby realize the above-mentioned state in which airtightness and thermal insulation of the molding region are realized and electrical insulation between the dies is realized. Of the two thermal/electrical insulators 113 and 124, it is possible to provide just one thermal/electrical insulator 113 (or the thermal/electrical insulator 124) on one of the first die 110 and the second die 120.

A first support plate 114 is provided on the lower surface of the first die 110 such that it covers the first hollow portion 112. The first support plate 114 is a steel plate which supports the back side of the first die 110 which receives a pressing force from the second die 120. It is fixedly attached to the lower surface of the first die 110 with unillustrated bolts. The first support plate 114 is installed such that it closes the first hollow portion 112 of the first die 110 in a liquid-tight manner. A plurality of water supply holes 115 and a single water drain hole 117 are formed within the first support plate 114.

Each water supply hole 115 is a hole which extends like a pipe so as to supply cooling water to the first molding portion 111 which forms a portion of the first hollow portion 112 of the first die 110. One end of the water supply hole 115 is open to the right side surface of the first support plate 114. The other end of the water supply hole 115 extends to a position near a right end portion of the first molding portion 111 which forms a portion of the first hollow portion 112. The plurality of water supply holes 115 are arranged in the direction perpendicular to the plane of FIG. 1. The ends of the plurality of water supply holes 115 which are open to the right side surface of the first support plate 114 are connected to one end of an unillustrated water supply pipe through which cooling water is supplied to the water supply holes 115.

A plurality (two in the present embodiment) of water jetting pipes 116 directed toward the first molding portion 111 which forms the first hollow portion 112 are provided for each water supply hole 115 such that the water jetting pipes 116 are arranged in the left to right direction in FIG. 1. The water jetting pipes 116 are steel pipes for jetting the cooling water supplied from the water supply hole 115 toward the inner wall surface of the first molding portion 111, and they extend to a position near the wall surface of the first molding portion 111 which forms the first hollow portion 112.

The water drain hole 117 is a hole which extends like a pipe so as to drain cooling water from the first hollow portion 112 of the first die 110 to the outside of the first die 110. One end of the water drain hole 117 is open to the upper surface of the first support plate 114 which closes the first hollow portion 112, and the other end of the water drain hole 117 is open to the left side surface of the first support plate 114. The end of the water drain hole 117 which is open to the left side surface of the first support plate 114 is connected to an unillustrated drain pipe.

The first die 110 to which the first support plate 114 is fixedly attached is mounted on a first mounting plate 119 with unillustrated bolts with a thermal/electrical insulating base 118 interposed therebetween. The thermal/electrical insulating base 118 is a plate which provides thermal and electrical insulation between the first support plate 114 and the first mounting plate 119. In the present embodiment, the thermal/electrical insulating base 118 is formed by binding and forming glass fibers into the shape of a plate by using a phosphate as a binder, with the shape corresponding to the shape of the first support plate 114. The first mounting plate 119 is a steel plate for fixing the first die 110 to an unillustrated stationary platen of the molding device 100. Namely, the first die 110 is a so-called lower die (stationary die) mounted on the stationary platen fixedly provided in the molding device 100.

A second support plate 125 is provided on the upper surface of the second die 120 so as to cover the second hollow portion 122. The second support plate 125 is a steel plate which supports the back side of the second die 120 which receives a reaction force from the first die 110, and is fixedly attached to the upper surface of the second die 120 with unillustrated bolts. The second support plate 125 is attached so as to close the second hollow portion 122 of the second die 120 in a liquid-tight manner. A plurality of water supply holes 126 similar to water supply holes 115 are formed within the second support plate 125.

Each water supply hole 126 is a hole which extends like a pipe so as to supply cooling water to the second molding portion 121 which forms a portion of the second hollow portion 122 of the second die 120. One end of the water supply hole 126 is open to the right side surface of the second support plate 125. The other end of the water supply hole 126 extends to a position near a right end portion of the first molding portion 121 which forms a portion of the second hollow portion 122. The plurality of water supply holes 126 are arranged in the direction perpendicular to the plane of FIG. 1. The ends of the plurality of water supply holes 126 which are open to the right side surface of the second support plate 125 are connected to one end of the unillustrated water supply pipe through which cooling water is supplied to the water supply holes 126.

A plurality (four in the present embodiment) of water jetting pipes 127 directed toward the second molding portion 121 which forms the second hollow portion 122 are provided for each water supply hole 126 such that the water jetting pipes 127 are arranged in the left to right direction in FIG. 1. The water jetting pipes 127 are steel pipes for jetting the cooling water supplied from the water supply hole 126 toward the inner wall surface of the second molding portion 121. They extend to a position near the wall surface of the second molding portion 121 which forms the second hollow portion 122.

The second die 120 to which the second support plate 125 is fixedly attached is mounted on a second mounting plate 129 with unillustrated bolts with a thermal/electrical insulating base 128 being interposed therebetween. Like thermal/electrical insulating base 118, thermal/electrical insulating base 128 is a plate which provides thermal and electrical insulation between the second support plate 125 and the second mounting plate 129. In the present embodiment, the thermal/electrical insulating base 128 is formed by binding and forming glass fibers into the shape of a plate using a phosphate as a binder, with the shape corresponding to the shape of the second support plate 125. The second mounting plate 129 is a steel plate for fixing the second die 120 to an unillustrated movable platen of the molding device 100. Namely, the second die 120 is a so-called upper die (movable die) mounted on the movable platen which is provided in the molding device 100 so as to be movable in the vertical direction.

The other end of the water supply pipe (not shown) for supplying cooling water to the water supply holes 115 and 126 of the first and second support plates 114 and 125 is connected to a city water pipe. A water supply valve 131 is provided between the city water pipe and the water supply holes 115 and 126. Operation of the water supply valve 131 is controlled by a controller 140, which will be described later, so as to establish or break communication between the city water pipe and the water supply holes 115 and 126. Namely, the water supply valve 131 delivers cooling water (city water), which is supplied from the city water pipe, to the water supply holes 115 and 126 or stops the delivery.

An input/output electrode 132 and a connection electrode 134 are provided on opposite side portions of the first die 110 which face each other via the first molding portion 111. An input/output electrode 133 and a connection electrode 135 are provided on opposite side portions of the second die 120 which face each other via the second molding portion 121. The input/output electrodes 132 and 133 are copper electrodes for supplying current to the first die 110 and the second die 120. The input/output electrodes 132 and 133, each of which is formed into the shape of a plate, extend along the left side surfaces of the first die 110 and the second die 120 in the direction perpendicular to the plane of FIG. 1.

The connection electrodes 134 and 135 are copper electrodes for electrically connecting the first die 110 and the second die 120 together or disconnecting the first die 110 and the second die 120 from each other. Of these connection electrodes 134 and 135, connection electrode 134 is formed into the shape of a plate and extends along the right side surface of the first die 110 in the direction perpendicular to the plane of FIG. 1. Connection electrode 134 has a plurality of cylindrical through holes 134a which are arranged in the direction perpendicular to the plane of FIG. 1 and which extend through connection electrode 134 in the vertical direction. Connection electrode 135 is formed into the shape of a plate and extends along the right side surface of the second die 120 in the direction perpendicular to the plane of FIG. 1. Connection electrode 135 has a plurality of rod-like plugs 135a provided at positions corresponding to the positions of the through holes 134a of connection electrode 134. The plugs 135a have a shape corresponding to that of the through holes 134a such that the plugs 135a can be inserted into the through holes 134a. The surfaces of the plugs 135a are plated with silver.

An electrical power supply apparatus 136 is connected to the input/output electrodes 132 and 133. The electrical power supply apparatus 136 is a power supply for supplying current which flows through the first die 110 and the second die 120. The electrical power supply apparatus 136 is controlled by the controller 140 such that the electrical power supply apparatus 136 supplies alternating current to the first die 110 and the second die 120 through the input/output electrodes 132 and 133. In the present embodiment, the electrical power supply apparatus 136 can output an AC voltage of about 40 V (frequency: 50 kHz) to the input/output electrodes 132 and 133 such that an alternating current of about 5000 A flows through the first die 110 and the second die 120. Of course, the alternating current (AC voltage) output from the electrical power supply apparatus 136 is properly set in accordance with the molding condition of a material for molding WK.

The molding device 100 includes the above-mentioned controller 140. The controller 140 is formed by a microcomputer which includes a CPU, ROM, RAM, and other necessary components. In accordance with an instruction from an operator input through an operation panel 141, the controller 140 executes a control program which is previously stored in a storage device such as ROM to thereby control various operations of the molding device 100. Specifically, the controller 140 mainly controls the operations of the water supply valve 131, the electrical power supply apparatus 136, a die drive apparatus 151, and a vacuum apparatus 152.

The operation panel 141 is a user interface which provides instructions to the controller 140 which controls the operation of the molding device 100, and the operation panel 141 also displays information from the molding device 100 (the controller 140). The die drive apparatus 151 is an electrical drive apparatus for moving the movable platen (not shown) which holds the second die 120 toward the first die 110 or separating the movable platen from the first die 110. Of course, the die drive apparatus 151 need not be an electric type and may be a hydraulic type. The vacuum apparatus 152 is a mechanical apparatus which evacuates air from the molding region between the first die 110 and the second die 120 when the first die 110 and the second die 120 are closed.

The molding device 100 includes other components such as an ejector pin (not shown) for removing a molded product PR from the first die 110. However, since these components do not relate directly to the present invention, they are not described herein.

(Operation of the Molding Device 100)

Figure 4:
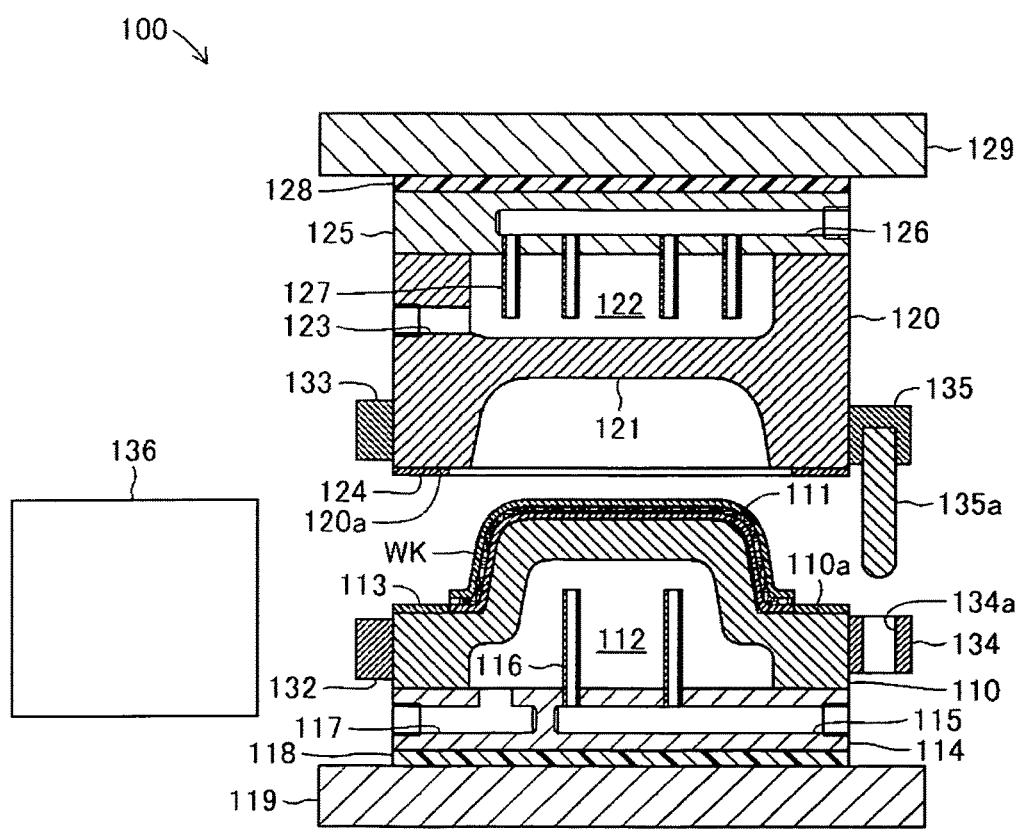
FIG. 4 is a sectional view schematically showing a state in which two dies of the molding device shown in FIG. 1 are open.

Next, the operation of the molding device 100 having the above-described structure will be described. First, as shown in FIG. 4, a worker prepares the material for molding WK from which the product PR is molded. In the present embodiment, two sheets of thermoplastic resin (e.g., polyethylene sheets) and a single fiber sheet (e.g., glass fiber sheet, carbon fiber sheet, metal fiber sheet, or the like) are prepared. Next, the worker starts the molding device 100. Specifically, the worker turns on the power supply of the molding device 100 by operating the operation panel 141 of the molding device 100. As a result, the controller 140 of the molding device 100 executes an unillustrated predetermined control program and enters a wait state in which the controller 140 waits for input of an instruction from the worker.

Next, the worker preheats the first die 110 and the second die 120. Specifically, the worker instructs the controller 140 to perform a die closing operation and start the supply of electricity thereto by operating the operation panel 141. In response to this instruction, the controller 140 controls the operation of the die drive apparatus 151 so as to move the second die 120 toward the first die 110 (downward in FIG. 1), to thereby bring the second die 120 into close contact with the first die 110. The controller 140 then controls the operation of the electrical power supply apparatus 136 so as to start the supply of electricity to the first die 110 and the second die 120. At this time, the first die 110 and the second die 120 come into close contact with each other in a state in which they are electrically insulated from each other by the thermal/electrical insulators 113 and 124, and the plugs 135a of connection electrode 135 are inserted into the through holes 134a of connection electrode 134, whereby the first die 110 and the second die 120 are electrically connected together.

The first die 110 and the second die 120 start to generate heat upon supply of electricity thereto from the electrical power supply apparatus 136. Specifically, the current output from the electrical power supply apparatus 136 flows into the first die 110 (or the second die 120) through the input/output electrode 132 (or the input/output electrode 133), flows through the second die 120 (or the first die 110) through connection electrode 134 (or connection electrode 135) and connection electrode 135 (or connection electrode 134), and returns to the electrical power supply apparatus 136 through input/output electrode 133 (or input/output electrodes 132). Namely, the connection electrodes 134 and 135 correspond to the electrical connection portion of the present invention, and the input/output electrodes 132 and 133, the connection electrodes 134 and 135, and the electrical power supply apparatus 136 correspond to the die energization means of the present invention.

Since the central portions of the first die 110 and the second die 120 (the first hollow portion 112 and the second hollow portion 122) are hollow, the current supplied to the first die 110 and the second die 120 flows through the first molding portion 111 and the second molding portion 121. Since the first molding portion 111 and the second molding portion 121 are smaller in thickness (i.e., cross-sectional area) than the first peripheral portion 110a and the second peripheral portion 120a, the volumes of portions to be heated are small. Due to the skin effect which occurs when alternating current (high frequency current) flows through the first die 110 and the second die 120, the current concentrates in the respective surface portions of the first molding portion 111 and the second molding portion 121. Because of these factors, the first molding portion 111 and the second molding portion 121 of the first die 110 and the second die 120 are heated quickly and efficiently. Since the current flows through the convex portions of the first die 110 and the second die 120 due to the edge-concentrating effect, the convex portions of the first molding portion 111 and the second molding portion 121 (portions indicated by dashed line circles in FIG. 1) are heated more than the remaining portions.

In the step of preheating the first die 110 and the second die 120, the first die 110 and the second die 120 are brought into close contact with each other through the thermal/electrical insulators 113 and 124 which electrically insulate them from each other. However, in the preheating step, the first die 110 and the second die 120 need not be brought into close contact with each other so long as electricity can be supplied to the first die 110 and the second die 120. Namely, the first die 110 and the second die 120 may be brought into a non-contacting state in which the first die 110 and the second die 120 are separated from each other but connection electrode 134 and connection electrode 135 are in contact with each other such that current flows therebetween.

After heating the first die 110 and the second die 120 by supplying electricity thereto for a predetermined period of time, the worker performs a die opening operation and sets the material for molding WK in place. Specifically, after elapse of the time required for the first molding portion 111 and the second molding portion 121 to reach a temperature of about 200° C., the worker instructs the controller 140 to perform the die opening operation and stop the supply of electricity by operating the operation panel 141. Needless to say, the time for which electricity is supplied to the first die 110 and the second die 120 is properly determined in accordance with the type and size of the material for molding WK and the electrical energy supplied to the dies. In response to this instruction, the controller 140 controls the operation of the die drive apparatus 151 so as to move the second die 120 away from the first die 110 (upward in FIG. 1) to thereby separate the second die 120 from the first die 110. The controller 140 then controls the operation of the electrical power supply apparatus 136 so as to stop the supply of electricity to the first die 110 and the second die 120.

Subsequently, as shown in FIG. 4, the worker sets the material for molding WK on the first molding portion 111 of the first die 110. In the present embodiment, the material for molding WK disposed on the first molding portion 111 of the first die 110 includes a fiber sheet and thermoplastic resin sheets disposed on opposite sides of the fiber sheet.

Next, the worker operates the operation panel 141 so as to instruct the controller 140 to perform a die closing operation and evacuate air from the dies. In response to this instruction, as in the above-described case, the controller 140 controls the operation of the die drive apparatus 151 so as to move the second die 120 toward the first die 110 (downward in FIG. 1) to thereby bring the second die 120 into close contact with the first die 110. In this case, the second molding portion 121 of the second die 120 moves toward the first die 110 while compressing and deforming the material for molding WK. Since the above-mentioned convex portions of the first molding portion 111 and the second molding portion 121 (indicated by dashed line circles in FIG. 1) are higher in temperature than the remaining portions due to the edge-concentrating effect, the material for molding WK can be deformed effectively.

After having brought the second die 120 into close contact with the first die 110, the controller 140 controls the operation of the vacuum apparatus 152 so as to start evacuation of air from the molding region between the first die 110 and the second die 120, which are in the closed state. Since the thermal/electrical insulators 113 and 124 disposed around the first molding portion 111 and the second molding portion 121 ensures the airtightness of the molding region between the first die 110 and the second die 120 in which the material for molding WK is disposed, the evacuation of air is performed precisely.

Next, the worker operates the operation panel 141 so as to instruct the controller 140 to form the material for molding WK. In response to this instruction, the controller 140 again controls the operation of the electrical power supply apparatus 136 so as to start the supply of electricity to the first die 110 and the second die 120. As a result, as in the above-described case, alternating current flows through the first and second molding portions 111 and 121 of the first and second dies 110 and 120, whereby the first and second molding portions 111 and 121 are heated. In this case, the controller 140 controls the operation of the electrical power supply apparatus 136 so as to heat the first and second molding portions 111 and 121 to a temperature at which the thermoplastic resin sheets of the material for molding WK melt and maintains the first and second molding portions 111 and 121 at that temperature for a predetermined period of time. In the present embodiment, the controller 140 heats the first and second molding portions 111 and 121 to a temperature of about 250° C. to 300° C., and maintain the first and second molding portions 111 and 121 at that temperature. As a result, the two thermoplastic resin sheets of the material for molding WK disposed between the first molding portion 111 and the second molding portion 121 melt and soak into the fiber sheet.

Conventionally, FRP (fiber reinforced plastic) is typically formed from thermosetting resin and a fiber sheet. This is because a thermosetting resin can more easily have fluidity at the time of molding compared with a thermoplastic resin. However, in the case of the molding device 100 of the present invention, during the step of forming the material for molding WK into the product PR, the material for molding WK can be heated by supplying electricity to the first die 110 and the second die 120. Therefore, the fluidity of a thermoplastic resin can be easily maintained and FRP can be easily manufactured using a thermoplastic resin within a short period of time (short cycle time).

Next, after elapse of a time required for the thermoplastic resin sheets of the material for molding WK to soak into the fiber sheet, the worker operates the operation panel 141 so as to instruct the controller 140 to perform a cooling operation. In response to this instruction, the controller 140 controls the operation of the electrical power supply apparatus 136 so as to stop the supply of electricity to the first die 110 and the second die 120 and controls the operation of the water supply valve 131 so as to open the water supply valve 131 to thereby introduce cooling water into the water supply holes 115 and 126. As a result, the water jetting pipes 116 and 127 communicating with the water supply holes 115 and 126 jet the cooling water toward the first molding portion 111 and the second molding portion 121, whereby the first molding portion 111 and the second molding portion 121 are cooled (see the dashed line arrows in FIG. 1).

Since the jetting pipes 116 and 127 extend to positions near the wall surfaces of the first and second molding portions 111 and 121 which form the first and second hollow portions 112 and 122, respectively, the first molding portion 111 and the second molding portion 121 can be cooled effectively. The water supply holes 115 and 126, the water jetting pipes 116 and 127, and the water supply valve 131 correspond to the cooling fluid supply means of the present invention.

As a result, the material for molding WK which has been disposed between the first molding portion 112 and the second molding portion 122 and which has been formed into the product PR is quickly cooled and solidified. The cooling water which has cooled the first molding portion 111 is discharged to the outside of the first die 110 through the water drain hole 117 formed in the first support plate 114, and the cooling water which has cooled the second molding portion 121 is discharged to the outside of the second die 120 through the water drain hole 123 formed in the second die 120 (see dashed lie arrows in FIG. 1). Upon solidification of the material for molding WK disposed between the first molding portion 112 and the second molding portion 122, the worker removes the solidified material for molding WK, namely, the product PR. Specifically, the worker operates the operation panel 141 so as to instruct the controller 140 to stop the cooling operation and perform a die opening operation.

In response to this instruction, the controller 140 controls the operation of the water supply valve 131 so as to close the water supply valve 131 to thereby stop the supply of cooling water to the water supply holes 115 and 126, and controls the operation of the die drive apparatus 151 so as to move the second die 120 away from the first die 110 (upward in FIG. 1) to thereby separate the second die 120 from the first die 110. The worker then operates the operation panel 141 to instruct the controller 140 to drive the unillustrated ejector pin provided in the first die 110. In response to this instruction, the controller 140 drives the ejector pin provided in the first die 110. As a result, the product PR adhering to the first molding portion 111 is ejected by the ejector pin, and the worker can remove the ejected product PR from the first die 110.

In the case where production of the product PR is to be continued, the worker again starts the molding operation from the step of preheating the first die 110 and the second die 120. In the case where production of the product PR is to be ended, the worker turns off the power supply of the molding device 100 by operating the operation panel 141. As a result, manufacture of the product PR by the molding device 100 is ended.

As can be understood from the above description of operation, the molding device 100 according to the above-described embodiment includes the electrical power supply apparatus 136 which supplies electricity to the first and second dies 110 and 120 which have the first and second molding portions 111 and 121 for forming the surface of the product PR. The thicknesses of the first and second molding portions 111 and 121 to which electricity is supplied from the electrical power supply apparatus 136 are smaller than those of the first and second peripheral portions 110a and 120a formed around the first and second molding portions 111 and 121, respectively. Namely, each of the first and second molding portions 111 and 121 which are to be heated has a reduced cross-sectional area. Therefore, when alternating current is supplied to the first and second dies 110 and 120, the first and second molding portions 111 and 121 can be quickly heated by using a smaller amount of electrical energy compared to the case where the first and second molding portions 111 and 121 have thicknesses equal to those of the first and second peripheral portions 110a and 120a. Furthermore, since the first and second molding portions 111 and 121 do not have conductor layers and insulating layers used in the conventional technique, the man-hours required for manufacturing the dies and maintaining them can be reduced. Namely, the molding device 100 according to the present invention can heat the dies by a simple structure while guaranteeing the durability of the molding portions of the dies.

Figure 5:
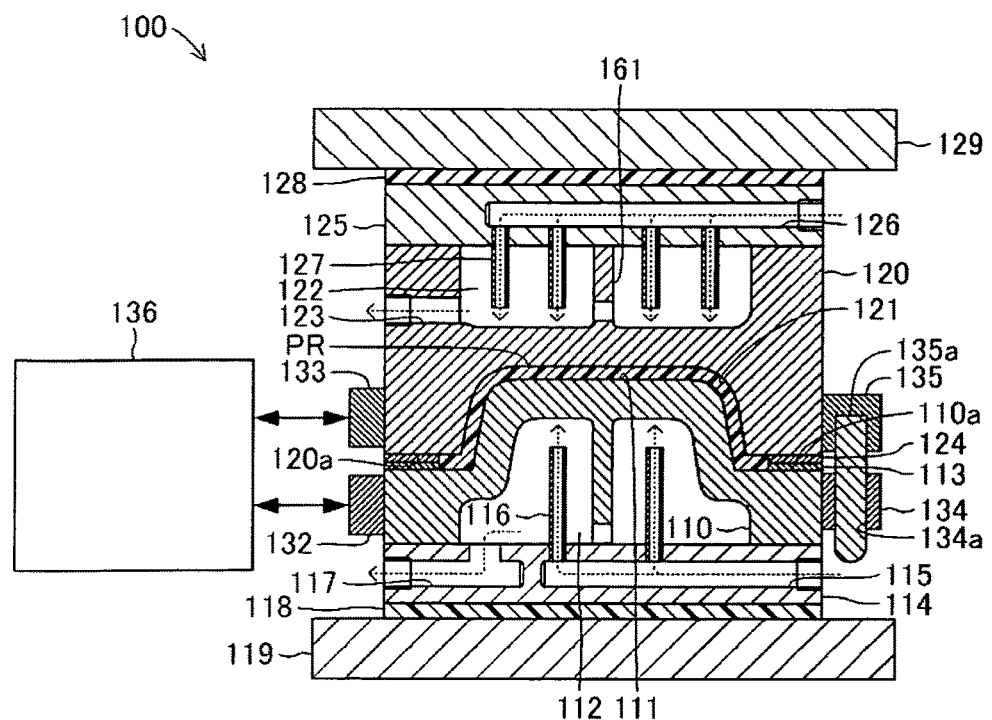
FIG. 5 is a sectional view schematically showing the structure of a main portion of a molding device according to a modification of the present invention.
Figure 6:
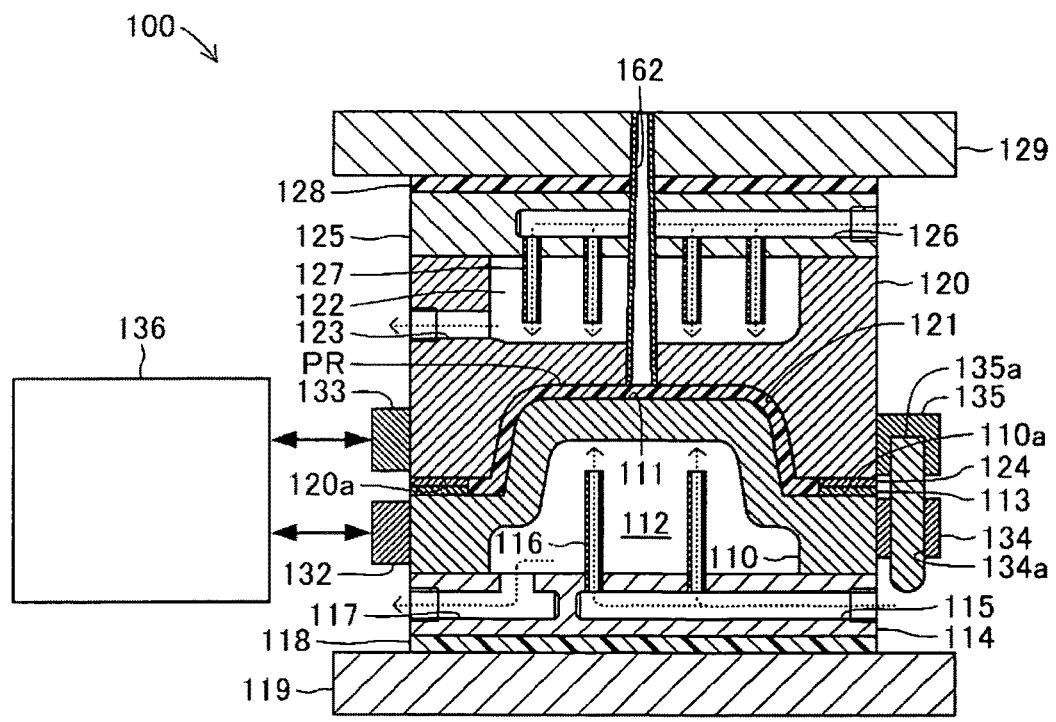
FIG. 6 is a sectional view schematically showing the structure of a main portion of a molding device according to another modification of the present invention.
Figure 7:
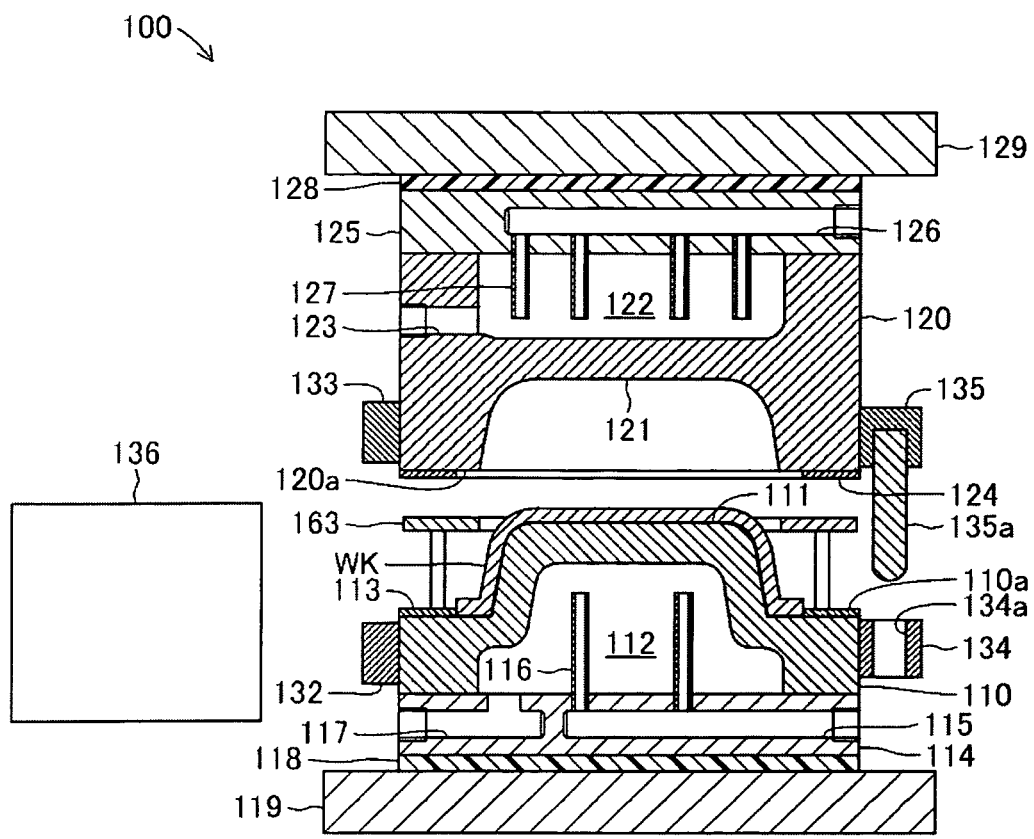
FIG. 7 is a sectional view schematically showing a molding device according to still another modification of the present invention in a state in which two dies of the molding device are open.

The present invention is not limited to the above-described embodiment, and it may be modified in various ways without departing from the scope of the present invention. In FIGS. 5 to 7 which show modifications of the invention, structural portions identical with those of the molding device 100 according to the above-described embodiment are denoted by the same reference numerals as those used for the molding device 100, and their descriptions will not be repeated.

In the above-described embodiment, the first molding portion 111 and the second molding portion 121 are heated by supplying electricity to the first die 110 and the second die 120. However, electricity may be supplied to at least one of the first die 110 and the second die 120. In the case where electricity is supplied to the first die 110 only, the second die 120 can be indirectly heated when the second die 120 is disposed near the first die 110 heated by the supply of electricity thereto or when it is disposed in close contact with the heated first die 110 with an insulator interposed therebetween.

In the above-described embodiment, the first die 110 and the second die 120 are preheated before the product PR is molded from the material for molding WK by using the first die 110 and the second die 120. However, the first die 110 and the second die 120 need not be preheated in the case where the first die 110 and the second die 120 are heated at time of molding of the product PR from the material for molding WK. Namely, in the case where the material for molding WK is pressed for molding in a state in which electricity is supplied to the first die 110 and the second die 120, preheating of the first die 110 and the second die 120 can be omitted.

In the above-described embodiment, the first hollow portion 112 and the second hollow portion 122 are formed in the first die 110 and the second die 120, respectively, so as to be located on the back side of the first molding portion 111 and the second molding portion 121. The first hollow portion 112 and the second hollow portion 122 prevent the electricity supplied to the first die 110 and the second die 120 from flowing through the central portions of the first die 110 and the second die 120 and cause the electricity to flow through the first molding portion 111 and the second molding portion 121. Namely, current which tends to flow through the first die 110 and the second die 120 along the shortest paths can be led to the first molding portion 111 and the second molding portion 121, whereby the first die 110 and the second die 120 can be heated efficiently. Also, the first hollow portion 112 and the second hollow portion 122 which are formed in the first die 110 and the second die 120 can reduce the weight of the molding device 100. In addition, cooling fluid supply means for cooling the first molding portion 111 and the second molding portion 121 or other components or mechanisms may be disposed within the first hollow portion 112 and the second hollow portion 122. However, the first hollow portion 112 and the second hollow portion 121 are not essential. Even in the case where the first die and the second die are formed without formation of the first hollow portion 112 and the second hollow portion 122, electricity can be supplied to the first molding portion 111 and the second molding portion 121. Furthermore, hollows corresponding to the first hollow portion 112 and the second hollow portion 121 may be formed in the first support plate 114 and the second support plate 125.

In the above-described embodiment, the cooling fluid supply means (the water supply holes 115 and 126, the water jetting pipes 116 and 127, and the water supply valve 131) cools the first molding portion 111 and the second molding portion 121 using water. However, instead of jetting water directly at the first molding portion 111 and the second molding portion 121, the cooling fluid supply means may be configured to supply water to the first molding portion 111 and the second molding portion 121 in the form of a mist or shower. Also, the cooling fluid supply means may be configured to cool the first molding portion 111 and the second molding portion 121 by using a cooling medium other than water. For example, a fluid (liquid or gas) such as oil or air may be use. The water jetting pipes 116 and 127 may be configured to strongly jet cooling water by throttling the discharging ends thereof. In the case where the first molding portion 111 and the second molding portion 121 need not be cooled quickly, the cooling fluid supply means may be omitted.

In the above-described embodiment, the first molding portion 111 and the second molding portion 121 have a thickness of about 20 mm. However, the thicknesses of the first molding portion 111 and the second molding portion 121 are properly determined in accordance with the types, shapes, and sizes of the material for molding WK and the product PR and molding conditions within a range of thickness smaller than the thicknesses of the first peripheral portion 110a and the second peripheral portion 120a. In this case, as shown in FIG. 5, ribs 161 for reinforcing the first molding portion 111 and the second molding portion 121 may be provided within the first hollow portion 112 and the second hollow portion 122. Thus, it becomes possible to reduce the thicknesses of the first molding portion 111 and the second molding portion 121 while maintaining the rigidity of the first molding portion 111 and the second molding portion 121. In FIG. 5, a single rib 161 is provided for each of the first molding portion 111 and the second molding portion 121. However, the number and shape of the ribs 161 are freely determined so long as the ribs 161 can support the first molding portion 111 and the second molding portion 121.

In the above-described embodiment, a cooling fluid supply means for cooling the first molding portion 111 and the second molding portion 121 is disposed within each of the first hollow portion 112 of the first die 110 and the second hollow portion 122 of the second die 120. In place of or in addition to the cooling fluid supply means, temperature sensors for measuring the temperatures of the first molding portion 111 and the second molding portion 121 may be provided in the first hollow portion 112 and the second hollow portion 122. In this case, the temperatures detected by the temperature sensors may be displayed on the operation panel 141 and may be used for controlling the heating and cooling of the first die 110 and the second die 120 by the controller 140. Since the worker and the controller 140 can know the temperatures of the first molding portion 111 and the second molding portion 121, the temperatures of the first molding portion 111 and the second molding portion 121 can be controlled properly, whereby products can be molded more efficiently and more accurately.

In the above-described embodiment, the thermal/electrical insulators 113 and 124 are disposed on the first peripheral portion 110a of the first die 110 and the second peripheral portion 120a of the second die 120. The thermal/electrical insulators 113 and 124 thermally insulate the molding region between the closed first and second dies 110 and 120 from the outside, maintain the airtightness of the molding region, and electrically insulate the first and second dies 110 and 120 from each other. However, the thermal/electrical insulators 113 and 124 may be provided so as to realize at least one of thermal insulation, maintenance of airtightness, and electrical insulation. For example, in the case where electricity need not be supplied when the first die 110 and the second die 120 are closed, namely, in the case where electricity need not be supplied at the time of molding the product PR from the material for molding WK, the thermal/electrical insulators 113 and 124 need not have the function of electrically insulating the first and second dies 110 and 120 from each other. The thermal/electrical insulators 113 and 124 may be formed of a material other than a resin, such as a ceramic or concrete. This also applies to the thermal/electrical insulating bases 118 and 128.

In the above-described embodiment, the connection electrodes 134 and 135 are configured such that the rod-like plugs 135a projecting from connection electrode 135 are inserted into the through holes 134a of connection electrode 134. This configuration makes it possible to supply electricity to the first die 110 and the second die 120 without bringing them into close contact with each other. However, the structure of the connection electrodes 134 and 135 is not limited to that employed in the above-described embodiment so long as the connection electrodes 134 and 135 enable the supply of electricity to the first die 110 and the second die 120. For example, connection electrode 134 may be formed by a pantograph mechanism which expands toward the second die 120, and connection electrode 135 may be formed by an electrode which comes into contact with a top portion of the pantograph mechanism.

In the above-described embodiment, the electrical power supply apparatus 136 supplies alternating current to the first die 110 and the second die 120. However, the electrical power supply apparatus 136 may be configured to supply direct current to the first die 110 and the second die 120. Since the first molding portion 111 and the second molding portion 121 are smaller in thickness, i.e., in cross-sectional area than the first peripheral portion 110a and the second peripheral portion 120a, the first molding portion 111 and the second molding portion 121 have a greater electrical resistance than the first peripheral portion 110a and the second peripheral portion 120a and are smaller in volume to be heated than the first peripheral portion 110a and the second peripheral portion 120a. Therefore, the first molding portion 111 and the second molding portion 121 are heated quickly and efficiently. The amount of electrical energy output from the electrical power supply apparatus 136 is properly set in accordance with the type and size of the material for molding and molding accuracy and is not limited to that employed in the above-described embodiment.

In the above-described embodiment, electricity is supplied to the first die 110 and the second die 120 by using the single electrical power supply apparatus 136 and the connection electrodes 134 and 135. However, the embodiment may be modified such that electricity is individually supplied from the single electrical power supply apparatus 136 to the first die 110 and the second die 120, or an electrical power supply apparatus 136 for supplying electricity to the first die 110 and an electrical power supply apparatus 136 for supplying electricity to the second die 120 may be provided separately.

In the above-described embodiment, a polyethylene resin is used for the material for molding WK. However, the material for molding WK is properly chosen in accordance with the specifications of the product PR, and other thermoplastic resins may be used for the material for molding WK. Examples of resins which can be used for the material for molding WK include polypropylene resins, polystyrene resins, polyvinyl chloride resins, polymethyl methacrylate resins, acrylonitrile-butadiene-styrene copolymers (so-called ABS resins), polyethylene terephthalate resins, polycarbonate resins, polyacetal resins, polybutylene terephthalate resins, polyamide resins, polyether-imide resins, polyether-sulfone resins, polyphenylene sulfide resins, polysulfone resins, and polyether-ether-ketone resins.

In the above-described embodiment, the material for molding WK is composed of thermoplastic resin sheets and a fiber sheet. However, the material for molding WK is properly chosen in accordance with the specifications of the product PR. Accordingly, the material for molding WK may be composed of a thermoplastic resin sheet only, or of a thermoplastic resin plate thicker than the thermoplastic resin sheet. Alternatively, the material for molding WK may be a fluid obtained by heating a thermoplastic resin. Namely, the molding device 100 of the present invention may be implemented in the form of an injection molding machine.

Specifically, as shown in FIG. 6, the molding device 100 configured as an injection molding machine includes a sprue 162 which forms a flow path for the material for molding WK and which is provided at the center of the first die 110. In the case of the molding device 100 configured as an injection molding machine, by preheating the first die 110 and the second die 120 before injection of the material for molding WK, so-called weld defects and so-called shrinkage cavities, which are molding defects occurring at the time of injection molding, can be prevented effectively, and the thickness of the product PR can be further reduced. Also, it is possible to accurately perform injection molding by using a material having a high melting point such as polyether-ether-ketone. In the molding device 100 configured as an injection molding machine shown in FIG. 6, the first die 110 is a movable die mounted on an unillustrated movable platen, and the second die 120 is a stationary die mounted on an unillustrated stationary platen. The first die 110 moves toward and away from the fixed second die 120.

In the molding device 100 configured as an injection molding machine, not only a thermoplastic resin but also a thermosetting resin (e.g., a phenol resin, melamine resin, urea resin, polyurethane resin, epoxy resin, or unsaturated polyester resin) may be used as the material for molding WK. In addition, injection molding may be performed by using a thermoplastic resin or a thermosetting resin which includes carbons fibers, glass fibers, metal fibers, metallic powder, or mineral powder.

In the molding device 100 configured as an injection molding machine, a product PR can be molded by, for example, steps 1 to 6 described below.

Step 1: a die closing step of bringing the first die 110 and the second die 120 into close contact with each other Step 2: a preheating step of heating the first die 110 and the second die 120 by supplying electricity thereto Step 3: an injection step of injecting a molten resin into the space between the dies through the sprue 162 (at this time, electricity may or may not be supplied to the dies)

Step 4: a cooling step of cooling the first die 110 and the second die 120 by supplying cooling water thereto Step 5: a die opening step of separating the first die 110 and the second die 120 from each other Step 6: an ejection step of ejecting the product PR from the first die 110 by driving an ejector pin Materials other than a resin, such as various metallic materials including a steel material, a titanium material, an aluminum material, and a magnesium material may be used as the material for molding WK. Namely, the molding device 100 of the present invention may be implemented as an injection molding machine or a press for metallic materials. In conventional press working for metallic materials, the material for molding WK is generally preheated before being disposed on the press in order to facilitate plastic deformation of the material for molding WK. In the case where the molding device 100 of the present invention is used as a press, since the material for molding WK disposed between the first die 110 and the second die 120 can be heated, the material for molding WK need not be preheated before being disposed on the press, and the work load on the machining press can be reduced. In addition, press forming of a steel material (specifically, high tension steel), plastic deformation of which is difficult, can be performed accurately and efficiently.

In the case where a material which can be plastically deformed relatively easily such as a titanium material, aluminum material, or magnesium material is pressed, as shown in FIG. 7, it is preferred that a die face 163 be provided between the first die 110 and the second die 120 so as to press and clamp the material for molding WK at the time of forming. The die face 163 is a steel member supported on an unillustrated support portion of the molding device 100 through shafts which penetrate the first die 110 such that the die face 163 can slide in the vertical direction in FIG. 7. When the second die 120 moves toward the first die 110, this die face 163 is pressed by the peripheral portion 120a of the second die 120 and clamps the material for molding WK on the first die 110. As a result, a material which can be plastically deformed relatively easily such as a titanium material, aluminum material, or magnesium material can be plastically deformed without formation of wrinkles.

In the molding device 100 configured as a press, a product PR can be molded by, for example, steps 1 to 6 described below.

Step 1: a preheating step of heating the first die 110 and the second die 120 by supplying electricity thereto Step 2: a material setting step of setting the material for molding WK in an open state of the dies in which the first die 110 and the second die 120 are separated from each other Step 3: a pressure applying step of applying pressure in a closed state of the dies in which the first die 110 and the second die 120 are brought into close contact with each other (no electricity is supplied to the dies)

Step 4: a cooling step of cooling the first die 110 and the second die 120 by supplying cooling water thereto Step 5: a die opening step of separating the first die 110 and the second die 120 from each other Step 6: an ejection step of ejecting the product PR from the first die 110 by driving an ejector pin

DESCRIPTION OF SYMBOLS

PR . . . product, WK . . . material for molding, 100 . . . molding device, 110 . . . first die, 110a . . . first peripheral portion, 111 . . . first molding portion, 112 . . . first hollow portion, 113 . . . thermal/electrical insulator, 113a . . . base portion, 113b . . . seal portion, 114 . . . support plate, 115 . . . water supply hole, 116 . . . water jetting pipe, 117 . . . water drain hole, 118 . . . thermal/electrical insulating base, 119 . . . mounting plate, 120 . . . second die, 120a . . . second peripheral portion, 121 . . . second molding portion, 122 . . . second hollow portion, 123 . . . water drain hole, 124 . . . thermal/electrical insulator, 124a . . . base portion, 124b . . . seal portion, 125 . . . support plate, 126 . . . water supply hole, 127 . . . water jetting pipe, 128 . . . thermal/electrical insulating base, 129 . . . mounting mounting plate, 131 . . . supply valve, 132, 133 . . . input/output electrode, 134, 135 . . . connection electrode, 134a . . . through hole, 135a . . . plug, 136 . . . electrical power supply apparatus, 140 . . . controller, 141 . . . operation panel, 151 . . . die drive apparatus, 152 . . . vacuum apparatus, 161 . . . rib, 162 . . . sprue, 163 . . . die face.

The invention claimed is:

1. A molding device comprising:
a first die which has a first molding portion which is formed into a three-dimensional shape corresponding to a portion of a surface of a product to be molded and which has a front side having a molding surface which contacts a material for molding during a molding operation and a back side, and a first peripheral portion which is formed around the first molding portion and supports the first molding portion;
a second die which has a second molding portion which is formed into a three-dimensional shape corresponding to another portion of the surface of the product and which faces the first die and which has a molding surface which contacts the material for molding during a molding operation, and a second peripheral portion which is formed around the second molding portion and supports the second molding portion;
an electricity supply apparatus which is disposed outside the dies and is electrically connected to both of the dies and supplies electric current which passes along the molding surface of each die to heat the first and second molding portions; and
an electrical connection portion which is disposed on an exterior of the dies, the electrical connection portion having a connected position in which it connects the first and second dies in series and conducts electric current from the electricity supply apparatus between the first and second dies and a disconnected position in which it prevents electric current from the electricity supply apparatus from flowing between the first and second dies.

2. A molding device as claimed in claim 1 including an electrical insulator which is disposed between opposing surfaces of the first and second peripheral portions between the first and second dies and electrically insulates the opposing surfaces of the first and second peripheral portions from each other.

3. A molding device as claimed in claim 1 wherein the first peripheral portion has a larger thickness measured in a height direction of the first die than the first molding portion.

4. A molding device as claimed in claim 1 wherein the first die includes a hollow portion which has a periphery defined by the first peripheral portion and extends along the back side of the first molding portion.

5. A molding device as claimed in claim 4 wherein the hollow portion has an inner surface defined by the first molding portion and the first peripheral portion of the first die, the first die has an opening in its bottom surface which communicates with an interior of the hollow portion, and the molding device further comprises a plate which covers the opening in the bottom surface of the first die.

6. A molding device as claimed in claim 4 including a supply conduit for a cooling fluid communicating with the hollow portion.

7. A molding device as claimed in claim 6 including a pipe disposed inside the hollow portion and connected to the supply conduit and having an open end opposing the back side of the first molding portion for discharging cooling fluid at the back side of the first molding portion.

8. A molding device as claimed in claim 4 including a support rib which is disposed in the hollow portion and is integrally formed with the first molding portion and supports the first molding portion.

9. A molding device as claimed in claim 4 including a temperature measurement sensor disposed in the hollow portion.

10. A molding device as claimed in claim 1 wherein the first molding portion is integrally formed with the first peripheral portion, and the second molding portion is integrally formed with the second peripheral portion.

11. A molding device as claimed in claim 1 wherein the first and second dies can undergo relative movement between a closed state which the dies assume during a molding operation and an open state, and the electricity supply apparatus supplies to at least one of the dies electric current which passes along the molding surface of the at least one of the dies when the dies are in the open state to preheat the at least one of the dies.

12. A molding device comprising:
a first die which has a first molding portion which is formed into a three-dimensional shape corresponding to a portion of a surface of a product to be molded and which has a front side having a molding surface which contacts a material for molding during a molding operation and a back side, and a first peripheral portion which is formed around the first molding portion and supports the first molding portion;
a second die which has a second molding portion which is formed into a three-dimensional shape corresponding to another portion of the surface of the product and which faces the first die and which has a molding surface which contacts the material for molding during a molding operation, and a second peripheral portion which is formed around the second molding portion and supports the second molding portion;
an electricity supply apparatus which is disposed outside the dies for supplying electric current to the dies;
a first input/output electrode which is mounted on the first die and electrically connected to the electricity supply apparatus;
a first connection electrode which is mounted on the first die on an opposite side of the first molding portion from the first input/output electrode;
a second input/output electrode which is mounted on the second die and electrically connected to the electricity supply apparatus; and
a second connection electrode which is mounted on the second die on an opposite side of the second molding portion from the second input/output electrode and which can be brought into and out of contact with the first connection electrode,
wherein the first and second dies are electrically connected in series to the electricity supply apparatus when the connection electrodes are contacting each other so that electric current from the electricity supply apparatus passes along the molding surface of each die to heat the first and second molding portions.

13. A molding device as claimed in claim 12 wherein the first connection electrode comprises a plate having a hole formed therein, the second connection electrode comprises a plug sized to be slidably received in the hole in the plate, the plug is disposed in the hole in the plate and electrically connected to the plate when the first and second dies are spaced from each other by a first distance, and the plug is spaced from the plate and electrically disconnected from the plate when the first and second dies are spaced from each other by greater than the first distance.

14. A molding method comprising:
disposing a material for molding between the first molding portion and the second molding portion of the molding device of claim 1;
passing current from the electricity supply apparatus through the electrical connection portion and along the molding surface of each of the first and second molding portions to heat the first and second molding portions; and
forming the material for molding into a product between the first and second molding portions.

15. A molding method as claimed in claim 14 wherein the first die includes a hollow portion which has a periphery defined by the first peripheral portion and extends along the back side of the first molding portion.

16. A molding method as claimed in claim 15, further comprising:
discharging a cooling fluid towards the back side of the first molding portion of the first die from within the hollow portion of the first die after forming the material for molding into the product.

17. A molding method as claimed in claim 16 including discharging the cooling fluid towards the back side of the first molding portion of the first die from a pipe disposed within the hollow portion.

18. A molding method as claimed in claim 14 including passing alternating current from the electricity supply apparatus in series through the first and second dies along the molding surfaces of the first and second dies.

19. A molding method as claimed in claim 14 including passing to at least one of the dies current from the electricity supply apparatus which passes along the molding surface of the molding portion of the at least one of the dies when the first and second dies are in an open state prior to molding to preheat the at least one of the dies.

20. A molding method as claimed in claim 14 wherein the first peripheral portion of the first die has a larger thickness measured in a height direction of the first die than the first molding portion.

* * * * *